W. N. BEST.
SWIVEL JOINT.
APPLICATION FILED OCT. 22, 1918.
1,300,109.
Patented Apr. 8, 1919.
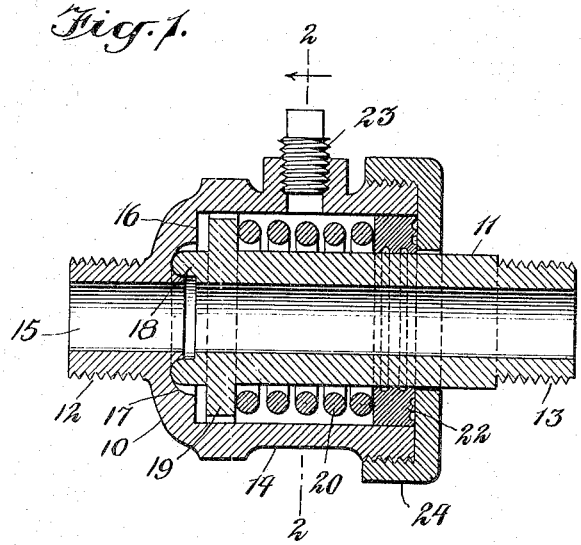
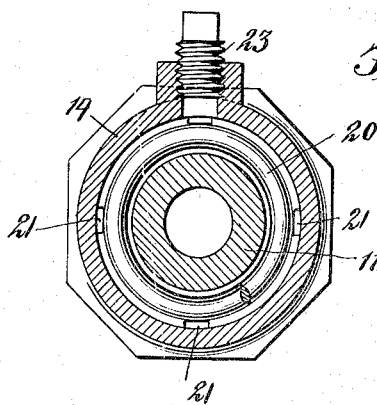
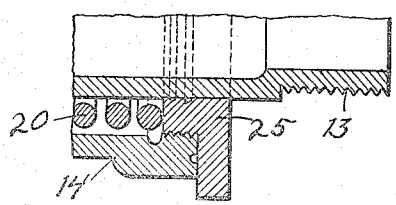
INVENTOR
William N Best
BY
ATTORNEY

UNITED STATES PATENT OFFICE.

WILLIAM N. BEST, OF BROOKLYN, NEW YORK.

SWIVEL-JOINT.

1,300,109.

Specification of Letters Patent.

Patented Apr. 8, 1919.

Application filed October 22, 1918. Serial No. 259,265.

*To all whom it may concern:*

Be it known that I, WILLIAM N. BEST, a citizen of the United States, and a resident of Brooklyn, in the county of Kings and State of New York, have invented certain new and useful Improvements in Swivel-Joints, of which the following is a specification.

This invention relates to certain improvements in swivel joints for pipes through which fluids are conducted. The main object of my invention is to provide a simpler, less expensive and more efficient construction particularly adapted for the handling of fluids when subjected to comparatively high temperatures. One use which I have particularly in mind for my improved construction is in connection with atomizing burners at which oil, tar or other combustible liquid or semi-liquid is atomized at the outlet by compressed air or steam. It is frequently necessary to have swivel joints in the conduits delivering these fluids to the burner and to have such swivel joints so close to the burner that they are subjected to the high temperature produced at the burner.

In my improved construction I provide, as one important feature thereof, and annular groove in a shoulder within the outer casing member of the coupling and spaced from the bore to receive the inner end of the other member and serve as a seat therefor. A coiled spring is employed for holding the inner member to its seat and a gasket at the opposite or outer end of the casing member serves as a stop for one end of the spring. The annular space between the members, which receives the spring, may also serve as a receptacle for a heavy lubricant such as graphite and oil. Thus the relative rotation of the members tends to grind the inner member to its seat and any leakage is resisted not only by the engagement of the parts at the seat, but also by the heavy lubricant and the gasket at the opposite end.

In the accompanying drawings to which reference is to be had, I have illustrated a preferred embodiment of my invention. In these drawings:

Figure 1 is a central longitudinal section through a swivel joint embodying my invention;

Fig. 2 is a transverse section on the line 2—2 of Fig. 1, and

Fig. 3 is a longitudinal section showing a slightly modified form.

In the improved construction illustrated I employ two main members (10 and 11) telescoping one within the other and mounted for relative rotation above their common axis. The outer ends of these members may be formed in any suitable manner for connection to pipe or hose sections. As illustrated, the members have threaded outer ends (12 and 13), although other equivalent means for connecting to pipes or the like may be provided. The casing member (10) has an outer annular wall (14) considerably larger than the bore (15) of the member and adapted to receive the main body of the inner member (11). The casing has an end wall connecting the peripheral wall (14) with the reduced threaded portion (12), the said end wall presenting an annular shoulder (16) encircling the bore (15). Within this annular shoulder is an annular groove (17), spaced from and concentric with the bore (15). This groove is preferably substantially semi-circular in cross section.

The inner member (11) has its inner end presenting an annular flange (18) slightly larger than the bore (15), and adapted to engage in the annular grove (17) as a seat. Preferably the outer end of this cylindrical flange is also substantially semi-circular in cross section, so as to fit the groove fairly snugly, although the outer edge of the groove may be somewhat enlarged or cut away to reduce the area of contact surface, permit better grinding of the parts in their seat, and facilitate the passage of lubricant to the seat.

The inner member has an annular flange (19) spaced from the cylindrical flange (18) so that when the latter is in the groove the said flange (19) will be spaced a slight distance from the shoulder (16). This annular flange (19) serves not only as a guide for engagement with the inner surface of the peripheral wall (14) and prevent any lateral movement of the flange (18) in its seat, but also serves as a stop for one end of a heavy coiled spring (20) encircling the inner member within the casing. The flange (19) may have notches or recesses (21) about its periphery to permit the free passage of lubricant from one side to the other.

At the opposite or open end of the casing member I provide a gasket (22) which substantially fills the annular space between the two members. This serves as a stop or seat for the opposite end of the spring (20) and as a closure for the annular space between the two members. This annular space serves as a receptacle for a heavy lubricant, such for instance as graphite, or graphite and oil, which may be delivered through to its chamber through a suitable opening normally closed by a plug (23). The gasket (22) may have grooves on its interior face and outer end to prevent or retard the escape of the lubricant from the chamber, the gasket being held in place in any suitable manner and forced inwardly by such holding means to put the spring (20) under compression. In Fig. 1 I have shown a collar (24) threaded on the exterior of the casing member and provided with an inwardly directed flange encircling the inner member and engaging with the outer face of the gasket. As an alternative I might employ a gland member (25) as shown in Fig. 3 and thread this into the interior of the casing member. This would permit a slightly smaller diameter but slightly greater length of the parts and one less part. In this case the inner cylindrical flange of the gland constitutes or may constitute the gasket, and there may be grooves in the inner cylindrical surface thereof.

It is thought that the operation will be sufficiently clear from the foregoing description. The parts are connected together as shown and the chamber filled with the lubricant. The latter may work past the flange (19) through the recesses (21) to the seat in the shoulder (16) but is prevented from escaping from the casing to any considerable extent by the gasket (22). The relative rotation of the parts tends to grind the inner member to its seat while at the same time the flange (19) prevents lateral movement on the seat.

Having thus described my invention, what I claim as new and desire to secure by Letters Patent is:

1. A swivel joint including a casing member having a shoulder therein encircling the bore, and an annular groove in said shoulder spaced from the bore, an inner member projecting into said casing and having the end thereof seating in said groove, an annular flange spaced from said end, a gasket at the opposite end of the casing member and encircling said inner member, and a coiled spring encircling said inner member between said flange and said gasket and pressing said inner member axially and holding it in its seat.

2. A swivel joint including a casing member having an annular groove in the inner surface of the end wall thereof and encircling the bore and spaced from the latter, an inner member having a terminal cylindrical flange larger than the bore, and seating within said groove, a coiled spring within said casing member and encircling said inner member, and stops for the ends of said spring, one of said stops being connected to the inner member and the other to the outer member whereby the spring holds the inner member to its seat within said groove.

3. A swivel joint including a casing member having a bore at one end, an annular shoulder encircling the bore, and an annular groove, semi-circular in cross section in said shoulder spaced from said bore, an inner member having a terminal cylindrical flange, the outer end of which is substantially circular in cross section adapted to fit within said groove, and a coiled spring within said casing for pressing said flange axially and holding it within said groove, the casing having a filling opening and a closure therefor whereby the space receiving said spring may be filled with lubricant.

4. A swivel joint including two telescoping relatively rotatable members, the inner member having an annular groove therein substantially semi-circular in cross section, and the inner member having a terminal flange adapted to fit within said groove, annular members spacing said first mentioned members apart, a coiled spring between said annular members, and means for filling the space there between with a lubricant.

Signed at New York city in the county of New York and State of New York this 19th day of October, A. D. 1918.

WILLIAM N. BEST.